United States Patent Office 3,025,298
Patented Mar. 13, 1962

3,025,298
METHYL O-AMINOBENZOYL-RESERPATES
Emil Schlittler, Madison, N.J., assignor to Ciba Pharmaceutical Products, Inc., Summit, N.J., a corporation of New Jersey
No Drawing. Filed July 7, 1958, Ser. No. 746,610
7 Claims. (Cl. 260—287)

This is a continuation-in-part application of my application Serial No. 696,336, filed November 14, 1957 (now abandoned), which in turn is a continuation-in-part application of my application Serial 526,780, filed August 5, 1955, (now Patent No. 2,824,874), which in turn is a continuation-in-part application of my application Serial No. 376,984, filed August 27, 1953 (now abandoned), which in turn is a continuation-in-part application of my application Serial No. 373,461, filed August 10, 1953 (now abandoned), which in turn is a continuation-in-part of my application Serial No. 361,879, filed June 15, 1953 (now abandoned), which in turn is a continuation-in-part of my application Serial No. 353,920, filed May 8, 1953 (now abandoned.)

The present invention relates to a new series of diesters of reserpic acid and salts thereof, as well as the preparation of such compounds.

From investigations I made jointly with J. Mueller and H. J. Bein, it is known that from Rauwolfia serpentina Benth an alkaloid having sedative action can be isolated in pure form which is called reserpine [Experientia, volume VIII, page 338 (1952)]. Reserpine also has a pronounced hypotensive action and is of great therapeutic importance. The alkaloid itself and the process of its preparation are more thoroughly described in U.S. patent application Serial No. 367,357, filed on July 10, 1953, now U.S. Patent No. 2,752,361, issued on June 26, 1956, to me and Johannes Mueller.

I have made the observation that when reserpine is treated with certain agents described below a carboxylic acid is obtained, to which I have given the name reserpic acid. My investigations have shown that in addition to the free carboxyl group reserpic acid has a free hydroxyl group and can be represented by the formula:

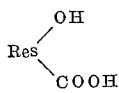

in which the radical "Res" stands for the divalent organic radical bound to the free hydroxyl and carboxyl groups in the reserpic acid.

Reserpic acid has the following physical characteristics: melting point 239–245°; ultraviolet spectrum (in ethanol): maxima at $\lambda=224$ m$\mu$($\epsilon=31,000$), 270 m$\mu$($\epsilon=5,040$), 294 m$\mu$($\epsilon=6,520$); minima at $\lambda=250$ m$\mu$($\epsilon=3,400$), 280 m$\mu$($\epsilon=4,210$); infrared spectrum (in "Nujol", given in reciprocal centimeters) absorption bands at 3520–3480 (incline), 3240 (broad band), 2900, 2850, (broad band), 1625, 1605–1585 (broad band), 1570, 1505 1465, 1395, 1378, 1365, 1317, 1280, 1242, 1221 (flat), 1201, 1163, 1140, 1108, 1078, 1028, 973, 950, 905, 804, 750, 720. The microanalysis gives the following values in percent: C=65.66; H=7.33; H= 6.98; empirical formula:

$$C_{22}H_{28}O_5N_2.$$

The radical "Res" in the above srtructural formula has, therefore, the empirical formula: $C_{21}H_{26}O_2N_2$.

My investigations have further disclosed the fact that by conversion of the free carboxyl group of reserpic acid into a carbomethoxy group methyl reserpate (reserpic acid methyl ester) of the formula:

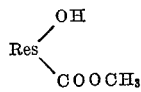

is formed, which can be converted into reserpine of the formula:

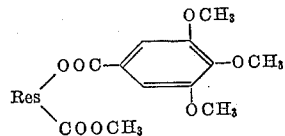

by esterification of the free hydroxy group with a 3,4,5-trimethoxy-benzoic acid.

The present invention relates particularly to esters of methyl O-benzoyl reserpate in which the benzoyl radical is substituted by at least one amino group, and the salts of such compounds. An amino group stands more particularly for a primary, a secondary, or a tertiary amino group. Secondary or tertiary amino groups may be substituted by lower hydrocarbon radicals, such as lower alkyl, e.g. methyl, ethyl, propyl, or isopropyl; lower alkenyl, e.g. allyl; or monocyclic aryl or aralkyl, e.g. phenyl or benzyl. Tertiary amino groups may also be N,N-lower alkylene-imino groups, the lower alkylene radical of which may be a straight carbon chain or such chain may be interrupted by hetero atoms, e.g. oxygen, nitrogen or sulfur, thus form an oxa-, aza-, or thia-alkylene radical; taken together with the nitrogen atom such lower alkylene radicals may form a pyrrolidino, a piperidino, e.g. piperidino or 3-methyl-piperidino, a hexamethyleneimino, a morpholino, a thiamorpholino or a piperazino, e.g. $N^4$-methyl-piperazino, radical. In addition to the amino groups the benzoyl radical may contain other substituents such as hydroxyl groups; lower alkoxy groups, e.g. methoxy; acyloxy groups, e.g. acetoxy or ethoxycarbonyloxy; or lower alkyl groups, e.g. methyl.

The new diesters of reserpic acid of this invention have valuable pharmacological properties and may be used as medicaments. Generally, they show the strong sedative and tranquilizing properties which are characteristic for reserpine; however, the powerful hypotensive component of the latter is greatly reduced or totally absent. The new esters may, therefore, be used as sedative and tranquilizing agents in states of anxiety and stress. In addition to the qualitative differences the new diesters of the above formula have a much faster onset of action than reserpine and are therefore especially suitable in emergency conditions, which require fast acting sedative and tranquilizing action, such as, for example, in the treatment of shock. Illustrative of this group of esters is, for example, methyl O-(3-dimethylamino-benzoyl)-reserpate or the therapeutically useful acid addition salts thereof.

The first stage of the process for the preparation of the new diesters of reserpic acid comprises subjecting reserpine to the action of an alkaline saponifying medium.

Depending on the procedure which is followed, it is possible to split both ester groups or to saponify reserpine partially, splitting but the esterified hydroxyl group. To achieve one or the other end, one may work with different alkaline saponifying agents or with the same, but under different conditions, as, for example, in the presence or absence of water, at a lower or higher temperature or for a longer or shorter period of time. For example, when reserpine is heated for a comparatively long time with the solution of an alkali hydroxide, such as potassium hydroxide, in an alcohol, such as methanol, both ester groups are hydrolyzed. When the treatment is performed with the same agent under milder conditions, e.g. over a short period, only the esterified hydroxyl group is split.

For partial saponification, however, reserpine is advantageously hydrolyzed with a saponifying agent capable of converting an esterified hydroxyl group into a free hydroxyl group and simultaneously reesterifying any hydroxized carboxyl group, a process which can be achieved by alcoholysis. This procedure is described in application Serial No. 376,523, filed August 25, 1953, now U.S. Patent No. 2,786,844 issued March 26, 1957, to Harold B. MacPhillamy and Charles F. Huebner. According to this patent it is of advantage to treat reserpine with anhydrous methanol in the presence of an alcoholate, such as an alkali metal methylate, e.g. sodium methylate, or some other alcoholyzing agent, such as sodium carbonate or piperidine, to form methyl reserpate. For conversion into reserpic acid, methyl reserpate can be further treated in an alkaline medium, e.g. with an alcohol solution of an alkali hydroxide such as a methanol solution of potassium hydroxide.

Methyl reserpate can also be obtained by treating reserpic acid or a salt thereof with an esterifying agent capable of converting a carboxyl group into a carbomethoxy group. Advantageously, reserpic acid or a salt thereof, e.g. the hydrochloride, is reacted with diazomethane, or it is esterified with methanol in the presence of acid, such as a hydrohalic acid, e.g. hydrochloric acid.

Several methods for the preparation of the new esters of methyl reserpate of this invention may be anticipated. For example, a methyl O-benzoyl-reserpate, in which the benzoyl radical contains at least one nitro group, may be treated with catalytically activated hydrogen, if desired, in a presence of an aldehyde or a ketone, and, if desired, a resulting salt may be converted into the free base, and/or, if desired, the free base may be converted into a salt thereof.

The catalytic reduction with hydrogen is carried out under normal pressure or only slightly higher than normal pressure, and at room temperature or at an elevated temperature. The preferred solvents are lower alkanols, e.g. methanol, ethanol, propanol, isopropanol or butanol. A catalyst containing a metal of the eighth group of the periodic system may be used. A palladium catalyst, such as palladium on charcoal, is preferred; however, platinum, e.g. platinum oxide or platinum black, or nickel, e.g. neutral Raney nickel, may be used as well. The choice of the catalyst and/or the solvent is determined by several factors, such as isomerization on the carbon atom 3 of the reserpate molecule, basicity of the catalyst, etc.

To prepare methyl O-benzoyl reserpate, in which the benzoyl radical contains at least one secondary or tertiary amino group, the above reduction may be carried out in the presence of an aldehyde or a ketone, i.e. such amino groups are formed by reductive alkylation. Aldehydes used in such a reduction are, for example, lower alkanals, such as formaldehyde, advantageously used in an aqueous solution of from about 20 to about 40 percent, preferably of about 37 percent strength, acetaldehyde or propionaldehyde or aromatic aldehydes, e.g. benzaldehyes. If aldehydes of simple constitution are used, the reductive alkylation yields the tertiary amino groups such as dimethylamino or diethylamino, in preference over the secondary amines. However, by using ketones, for example, di-lower alkyl ketones, such as acetone or methyl ethyl ketone, the secondary amino rather than the tertiary amino groups are formed.

A modification of the above-described direct conversion of a nitro group into a secondary or a tertiary amino group consists in reducing such a nitro group to a primary amino group and subsequently converting the latter into a secondary or a tertiary amino group. Such conversion of a primary amino group may be carried out according to several alkylation processes. Upon reductive alkylation, i.e. hydrogenation with catalytically activated hydrogen in the presence of an aldehyde or a ketone, such as those described hereinbefore, a primary amino group may be converted into a tertiary or a secondary amino group. Thus, catalytic hydrogenation of a methyl O-benzoyl-reserpate, containing at least one primary amino group as a substituent of the benzoyl radical, in the presence of an aqueous formaldehyde solution affords the conversion of such an amino group into a dimethylamino group. Or, by using acetone, an amino group is converted into an isopropylamino group. Or, a methyl O-benzoyl-reserpate, in which the benzoyl radical is substituted by at least one primary amino group, may be treated with an aldehyde to form the Schiff base, which is then converted to a secondary amino group by reduction. For example, a methyl O-amino-benzoyl-reserpate may be treated with benzaldehyde and the resulting Schiff base hydrogenated in the presence of a catalyst, e.g. palladium, to form a methyl O-benzylamino-benzoyl-reserpate. A specific methylation process to form a methylamino group by starting from a methyl O-benzoyl-reserpate containing a primary amino group as a substituent of the benzoyl radical, consists in treating the latter with formaldehyde in the presence of formic acid.

A further process, which is generally used for the preparation of esters of methyl reserpate, comprises treating methyl reserpate with a benzoic acid in the form of a reactive functional derivative, or a salt thereof, such as an acid halide, e.g. chloride, or an anhydride, or salts thereof, preferably in the presence of an acid binding reagent, such as an alkali metal or an alkaline earth metal carbonate, or hydrogen carbonate, e.g. sodium or potassium carbonate, or of an organic base such as a tertiary amine, e.g. pyridine or collidine. The liquid organic bases may also be used as solvents; other solvents are inert organic solvents, such as hydrocarbons or halogenated hydrocarbons. This type of esterification may be especially used for the preparation of methyl O-benzoyl-reserpates, in which the benzoyl group contains at least one tertiary amino group as substituent. Thus, methyl reserpate may be, for example, treated with a tertiary amino-benzoyl chloride, or a salt, e.g. hydrochloride, thereof, to yield the desired methyl O-tertiary amino-benzoyl-reserpate.

This latter process is also suitable for the preparation of the starting material used in the reduction process previously described. The methyl O-benzoyl-reserpates, which contain at least one nitro group attached to the benzoyl radical, may therefore be obtained by treating methyl reserpate with a benzoic acid substituted by at least one nitro group, such a benzoic acid being employed in the form of a functional derivative thereof such as an acid halide, e.g. chloride, or an anhydride, and preferably used in the presence of one of the acid binding compounds described hereinbefore, e.g. pyridine.

The new methyl O-benzoyl-reserpates, in which the benzoyl radical is substituted by at least one primary amino group, may also be obtained by hydrolysis of an acylamino group to a free amino group in corresponding methyl O-benzoyl-reserpates, which contain at least one acyl amino group attached to the benzoyl radical. Such acylamino groups are especially those in which the acyl group is derived from carbonic acid or a derivative thereof; such acyl groups may be represented by benzyloxy-carbonyl groups, or lower alkoxy-carbonyl groups, e.g. methoxy-carbonyl or ethoxy-carbonyl. The hydrolysis of such acyl amino groups may be achieved by treatment with aqueous ammonia; however, care has to be taken that neither the benzoyloxy nor the carbomethoxy group of the diester of reserpic acid is split.

Depending on the conditions of the process, the new reserpic acid esters may be obtained in the form of the free base or as salts. The bases may be converted into their therapeutically useful, non-toxic acid addition salts, for example, by treating them with inorganic or organic acids, such as hydrohalic acids, e.g. hydrochloric or hydrobromic acid, sulfuric acid, phosphoric acid, nitric acid, hydroxyethane sulfonic acid, toluene sulfonic acid, acetic acid, tartaric acid or citric acid. From the salts, the reserpic acid esters may be obtained in the free form, for example, by reaction with silver carbonate or aqueous ammonia. Mono-, bis-, or polysalts may be found depending on the conditions of salt formation and/or the number of salt forming groups. The new esters and their salts may also crystallize as the hydrates, e.g. hemihydrates, monohydrates, sesquihydrates or polyhydrates.

The following examples will serve to illustrate the invention. The relationship of parts by weight to parts by volume is the same as that of the gram to the milliliter. Temperatures are given in degree centigrade.

*Example 1*

One part by weight of reserpine is refluxed with 40 parts by volume of 1 N methanolic potassium hydroxide, under nitrogen for 1½ hours. The solution is cooled, adjusted to pH 1–2 with 1:1 hydrochloric acid (6 N) and filtered to remove the potassium chloride. The filtrate is evaporated almost to dryness, slurried with two 25 parts by volume portions of ether and partially dissolved in 25 parts by volume of methanol. The methanol is evaporated almost to dryness and the residue again extracted with two 25 parts by volume portions of ether. The solid remaining is dissolved in 50 parts by volume of methanol, adjusted with 1 N methanolic potassium hydroxide to about pH 6 and evaporated almost to dryness. Addition of 50 parts by volume of chloroform dissolves the bulk of the solid, leaving potassium chloride. Evaporation of the chloroform extract leaves crude reserpic acid which crystallizes on the addition of a small amount of methanol and warming in a water bath. Ether is added dropwise to complete the crystallization and the crystals are filtered and washed with ether. The reserpic acid thus obtained in the form of the hydrochloride melts at 255–258° C. It has the empirical formula: $C_{22}H_{28}O_5N_2 \cdot HCl$. The hydrochloride is very soluble in water, substantially insoluble in dry chloroform and moderately soluble in methanol-chloroform. It has optical rotations: $[\alpha]_D^{25} = -75°$ (1% $H_2O$) and $[\alpha]_D = -80^{\pm 3°}$ ($CCHCl_3$). The compound analyzes as follows (in percent): C=59.59; H=7.06; N=6.2; Cl=8.12; O=19.03 (by difference). The compound exhibits characteristic absorption bands in the infrared region of the spectrum when suspended in solid form in a hydrocarbon oil (Nujol) at the following frequencies expressed in reciprocal centimeters: 3450 (broad band), 3225, 2915 (broad band), 2850–2880 (flat), 2585 (broad band), 1685, 1630, 1605, 1578, 1511, 1482, 1465, 1450, 1405, 1370, 1350, 1335, 1310, 1290, 1265, 1250, 1230, 1205, 1160, 1145, 1090, 1075, 1055, 1020, 980, 950, 900, 870, 840, 820, 780, 755, 712, 675, 625. In ethanol, reserpic acid hydrochloride exhibits absorption bands in the ultra-violet region of the spectrum having maxima at 222 m$\mu$($\epsilon$=33,330), 268 m$\mu$($\epsilon$=5150); 294 m$\mu$($\epsilon$=6776); and minima at 248 m$\mu$($\epsilon$=2942) and 278 m$\mu$($\epsilon$=4146).

Reserpic acid hydrochloride can be converted to the free acid as follows: 0.1 part by weight of reserpic acid hydrochloride is dissolved in 10 parts by volume of methanol and stirred with 0.125 part of powdered silver carbonate for 10 minutes. The solution is filtered to remove excess silver carbonate and the silver chloride formed, and the filtrate evaporated to dryness, whereupon a pale yellow solid is obtained. Recrystallization from 1 to 2 parts by volume of methanol yields almost colorless crystals of reserpic acid, M.P. 239–245°. Analysis: C=65.66, H=7.33, N=6.98, O=20.03 (by difference).

In ethanol the free reserpic acid exhibits absorption bands in the ultraviolet region of the spectrum having maxima at 224 m$\mu$($\epsilon$=31,000), 270 m$\mu$($\epsilon$=5,040), 294 m$\mu$($\epsilon$=6,520); and minima at 250 m$\mu$($\epsilon$=3,440) and 280 m$\mu$($\epsilon$=4,210). The free reserpic acid exhibits characteristic absorption bands in the infrared region of the spectrum when suspended in solid form in a hydrocarbon oil (Nujol) at the following frequencies expressed in reciprocal centimeters: 3520–3480 (incline), 3240 (broad band), 2900, 2850 (broad band), 1625, 1605–1585 (broad band), 1570, 1505, 1465, 1395, 1378, 1365, 1317, 1280, 1242, 1221 (flat), 1201, 1163, 1140, 1108, 1078, 1028, 973, 950, 905, 829, 804, 750, 720.

The reserpic acid can be converted into the hydrochloride as illustrated by the following example: 0.1 part by weight of reserpic acid is slurried in 5 parts by volume of methanol and the pH adjusted to 3–4 by adding several drops of 1:1 hydrochloric acid. The resulting solution is concentrated under reduced pressure to a small volume, whereupon white crystals are formed. After standing a few minutes, the crystals are filtered off. The reserpic acid hydrochloride thus obtained melts at 257–260°. The mother liquor, on standing, yields further crystals of reserpic acid hydrochloride.

The free reserpic acid may also be converted into metal salts, for example, the alkali metal salts, as illustrated by the following example: 0.1 part by weight of reserpic acid is mixed with 0.25 part of volume of 1 N methanolic potassium hydroxide. The solution thus obtained is filtered, and the filter washed with 1 part by volume of methanol. To the filtrate is added 25 parts by volume of ether, whereupon potassium reserpate precipitates as a white powder. The salt is collected on a filter and washed once with 5 parts by volume of ether and dried. The salt begins to char at above 200°, is black at 250°, and melts at 270–300°.

Alkaline earth metal salts, e.g. barium and calcium salts can be prepared in a similar manner by employing the appropriate alkaline earth metal bases.

The reserpine employed as the starting material in the above example may be prepared as described in the aforementioned U.S. patent application Serial No. 367,357, filed July 10, 1953, now U.S. Patent No. 2,752,351, issued on June 26, 1956, to me and Johannes Mueller. The following illustrates the process: 7,000 parts by weight of powdered bark obtained from the roots of *Rauwolfia serpentina* Benth are percolated with 35,000 parts by volume of methanol. After evaporating the methanol extract, 1,050 parts by weight of a dark colored powder are obtained, which is treated with water repeatedly. The remaining insoluble residue is then treated five times, each time with 1,500 parts by volume of 10% aqueous acetic acid and the solution separated from the oily portion by centrifugation. The brown acetic acid solution is either concentrated at low temperatures or diluted with half of its volume of water and then has a pH of about 3.9. This solution is extracted with a total of 3,500 to 4,000 parts by volume of chloroform divided into 3 to 4 portions. The chloroform extracts are washed once with potassium carbonate solution and twice with water, then dried with sodium sulfate and completely evaporated in vacuum. The residue of 70 to 80 parts by weight is a green-brown colored powder. For further processing, this residue is dissolved in benzene and chromatographed on 1,000 to 1,200 parts by weight of neutral aluminum oxide (activity II–III according to the Brockmann standard). By eluting with benzene a small amount of a yellow oil is obtained first and afterwards 0.9 part by weight of a physiologically inactive crystalline material with a M.P. of 238–239° and then the sedatively active component follows. As soon as the main part of the active component is eluted, the chromatographic column is then further eluted with a mixture of 2 parts by volume of benzene and 1 part by volume of acetone. By doing so the remainder of the sedative principle is eluted and then physiologically inactive crystalline material with a M.P. 141–143° follows. The fractions which contain the sedative factor are evaporated to dryness. By recrystallizing the residue from hot acetone or a mixture of chloroform and ether, 6.5 to 7 parts by weight of residue (reserpine) are obtained in almost colorless crystals melting at 262–263° (with decomposition) and with a rotation $[\alpha] = -117°$ (chloroform).

*Example 2*

To a suspension of 1.2 parts by weight of reserpic acid hydrochloride in 50 parts by volume of 50% ether-methanol is added an excess of an ether solution of diazomethane. Nitrogen is evolved and most of the material gradually goes into solution. The reaction mixture is allowed to stand about 18 hours at room temperature and then the excess diazomethane is removed by distillation. The resulting solution is filtered and concentrated to dryness under reduced pressure at not over 40° C. The crystalline residue is recrystallized from methanol-ether solution and yields methyl reserpate, M.P. 240–242°. It has the empirical formula $C_{23}H_{30}O_5N_2$ and analyzes in percent as follows: C=66.68; H=7.34; N=7.06; O=18.92 (by difference); $[\alpha]_D = -101 \pm 3°$ ($CHCl_3$). The compound is insoluble in water, soluble in methanol, ethanol and chloroform. In ethanol, it exhibits absorption bands in the ultraviolet region of the spectrum having maxima at 226 m$\mu$($\epsilon$=33,830), 270 m$\mu$($\epsilon$=5,090), 298 m$\mu$($\epsilon$=6,080); and minima at 252–4 m$\mu$($\epsilon$=4,110) and 282 m$\mu$($\epsilon$=4,070). The compound exhibits characteristic absorption bands in the infrared region of the spectrum when suspended in solid form in a hydrocarbon oil (Nujol) at the following frequencies expressed in reciprocal centimeters: 3510, 3365, 2850–2950 (broad band), 1724, 1632, 1578, 1500, 1465, 1380, 1362, 1355, 1340, 1332, 1312, 1298, 1268, 1245, 1225, 1202, 1155, 1088, 1068, 1055, 1040, 1030, 1020, 1008, 970, 940, 912, 890, 860, 848, 835, 785, 770, 753, 720, 710, 655 and 625.

*Example 3*

To 50 parts by volume of anhydrous methanol is added 0.1 part by weight of metallic sodium and when the ensuing reaction has ceased, 1.0 part by weight of reserpine is suspended in the solution. The mixture is refluxed for three hours during which time the material gradually dissolves. The solution is then concentrated under reduced pressure at 40–50° C. to about 15 parts by volume and 50 parts by volume of water are then added; the pH of the solution is adjusted to 4.5–5 by the addition of 10% sulfuric acid. The resulting acid solution is extracted three times with 50 parts by volume portions of ether. The aqueous phase is then made alkaline with concentrated ammonia and the precipitated material taken up in chloroform. The chloroform solution is washed with water, dried and the solvent removed. The resulting oil crystallizes and is identified as methyl reserpate.

*Example 4*

A suspension of 3 parts by weight of methyl O-(3-nitrobenzoyl)-reserpate, 200 parts by volume of 95% ethanol, 2 parts by volume of 37% aqueous formaldehyde and 3 parts by weight of 10% palladium on charcoal is treated with hydrogen under atmospheric pressure over a period of 6¼ hours. The reaction mixture is filtered and the filtrate concentrated under reduced pressure to about 7 parts by weight, water is added and the mixture allowed to stand overnight. The resulting crystalline methyl O-(3-dimethylamino-benzoyl)-reserpate is recrystallized from a mixture of ethanol and water, M.P. 205–207.5°.

The starting material used in the above reaction may be prepared as follows: A mixture of 8 parts by weight of methyl reserpate and 25 parts by weight of 3-nitrobenzoylchloride in 60 parts by volume of pyridine is allowed to stand at 5° for three days. An excess of cold water is added and the aqueous mixture extracted with chloroform, which solution is washed twice with water, four times with 250 parts by volume portions of 3% aqueous potassium hydroxide and three times with water and then dried over sodium sulfate. The solvent is partly evaporated under reduced pressure and ether is added causing the precipitation of the methyl O-(3-nitro-benzoyl)-reserpate, which is filtered off and washed with ether, M.P. 224–227°.

*Example 5*

A solution of 2.59 parts by weight of methyl O-(2-methoxy-5-nitro-benzoyl)-reserpate in 300 parts by volume of 95% ethanol is reduced with hydrogen at atmospheric pressure using 0.5 part by weight of 10% palladium on charcoal as catalyst. The reaction mixture is filtered and concentrated under reduced pressure to a gum, which is dissolved in methanol, and the solution is allowed to stand at room temperature overnight. The crystalline methyl O-(2-methoxy-5-amino-benzoyl)-reserpate contains one mole of methanol after recrystallization from methanol, M.P. 148–153°.

The starting material used in the above reaction may be prepared as follows: A solution of 9.68 parts by weight of 2-methoxy-5-nitro-benzoic acid in 100 parts by volume of thionyl chloride is refluxed for one hour. The excess thionyl chloride is removed under reduced pressure and the residual thionyl chloride taken off by repeated addition and removal of 75 parts by volume portions of toluene under reduced pressure. The crude 2-methoxy-5-nitro-benzoyl chloride melts at 85.5°–87.5°. The above acid chloride is added to a cold solution of 16.95 parts by weight of methyl reserpate in 100 parts by volume of dry pyridine and stirred until the solid dissolves. After standing at room temperature overnight the pyridine solution is poured into 1200 parts by volume of water, and the precipitating gum is crystallized by decanting the water and adding methanol. After recrystallizing from methanol the methyl O-(2-methoxy-5-nitro-benzoyl)-reserpate melts at 242–244°.

*Example 6*

A solution of 1.1 parts by weight of methyl-(4-nitrobenzoyl)-reserpate in 50 ml. of methanol is hydrogenated in the presence of 0.1 part by weight of 10 percent palladium on charcoal; the hydrogenation solution is filtered and the solvent evaporated from the filtrate under reduced pressure. The residue is recrystallized from a mixture of ethyl acetate and petroleum ether and 0.5 part by weight of methyl O-(4-amino-benzoyl)-reserpate is obtained as a yellow powder, M.P. 208–212°.

The hydrochloride of methyl O-(4-amino-benzoyl)-reserpate may be prepared by treatment of an ethanol solution of the latter with an ether solution of hydrochloric acid.

The methyl O-(4-nitro-benzoyl)-reserpate used as the starting material may be prepared as follows: 5 parts by weight of methyl reserpate, 15 parts by weight of 4-nitrobenzoyl chloride and 38 parts by volume of pyridine are mixed under cooling and kept at 5° for three days. A mixture of ice and water is added and the solution extracted with 350 parts by volume of chloroform; the separated organic layer is washed three times with 3% aqueous sodium hydroxide, twice with a saturated aqueous sodium chloride solution and then dried over sodium sulfate. The solvent is evaporated under reduced pressure, ether is added to the residue and a brown powder is formed. The methyl O-(4-nitro-benzoyl)-reserpate is recrystallized from a mixture of ethanol and methylene chloride, M.P. 230–235°.

Example 7

A solution of 5 parts by weight of methyl O-(3-nitrobenzoyl)-reserpate in 200 parts by volume of methanol is hydrogenated in the presence of 0.5 part by weight of 10% palladium on charcoal, the reaction mixture then filtered and the filtrate evaporated under reduced pressure. The residue is dissolved in acetone, and upon addition of petroleum ether a solid is formed which is filtered off and dissolved in chloroform. The chloroform solution is filtered through Florex and then evaporated to dryness. The residue is dissolved in acetone, ether is added and the yellow precipitate filtered off. The filtrate is evaporated and the resulting foam redissolved in acetone. Upon careful addition of petroleum ether and partial evaporation on the steam bath, the yellow methyl O-(3-aminobenzoyl)-reserpate precipitates, M.P. 149–158°.

Example 8

3 parts by weight of methyl O-(3,5-dinitro-benzoyl)-reserpate is hydrogenated in a suspension of 0.5 part by weight of 10% palladium on charcoal in 150 parts by volume of methanol. The filtrate is evaporated under reduced pressure and the residue crystallizes from a mixture of acetone and petroleum ether. The methyl O-(3,5-diamino-benzoyl)-reserpate is recrystallized from the same mixture, M.P. 186–188°.

The starting material used in the above reaction may be prepared as follows: A mixture of 10 parts by weight of methyl reserpate and 30 parts by weight of 3.5-dinitrobenzoyl-chloride in 55 parts by volume of pyridine is allowed to stand at 5° for five days. An excess of cold water is added and the aqueous mixture extracted with chloroform, which solution is washed with three 160 parts by volume portions of 3% aqueous potassium hydroxide and three times with water and then dried over sodium sulfate. The organic solution is concentrated until crystals appear which are filtered off and washed with ether. A solution of these crystals in methylene chloride is filtered through Florex, the filtrate partially evaporated and the resulting crystalline methyl O-(3,5-dinitrobenzoyl)-reserpate filtered off, M.P. 235–239°.

Example 9

A mixture of 2.8 parts by weight of methyl O-(4-amino-benzoyl)-reserpate, 2 parts by volume of 37% aqueous formaldehyde and 2 parts by weight of 10% palladium on charcoal in 200 parts by volume of methanol is hydrogenated. The reaction mixture is filtered, the filtrate evaporated under reduced pressure and the foam dissolved in ethanol which solution is refiltered and evaporated to about 50 parts by volume. Water is added to opalescence, the solution warmed and allowed to stand. The resulting oil crystallizes, is filtered off and the methyl O-(4-dimethylamino-benzoyl)-reserpate recrystallizes from warm ethanol, M.P. 251–253°.

The methyl O-(4-dimethylamino-benzoyl)-reserpate may also be prepared by treating methyl reserpate with 4-dimethylamino-benzoyl chloride hydrochloride in pyridine.

Example 10

A solution of 1.4 parts by weight of methyl O-(2-nitro-3,4,5-trimethoxy-benzoyl)-reserpate in 350 parts by volume of ethanol is hydrogenated in the presence of 0.2 part by weight of 10% palladium on charcoal. The filtrate is partially evaporated and triturated to yield the methyl O-(2-amino-3,4,5-trimethoxy-benzoyl)-reserpate, M.P. 155–170°.

The starting material used in the above reaction may be prepared as follows: 50 parts by weight of methyl 3,4,5-trimethoxybenzoate in 200 parts by volume of acetic acid anhydride is nitrated at 0° with a mixture of 2 parts by volume of fuming nitric acid and 33 parts by volume of concentrated nitric acid. The resulting methyl 2-nitro-3,4,5-trimethoxy-benzoate is recrystallized from ethanol, M.P. 63–65, and the free acid, M.P. 165–168°, is obtained by treatment with an alcoholic potassium hydroxide solution and subsequent recrystallization from benzene. The acid chloride is obtained by reacting 14 parts by weight of the free acid with thionyl chloride and is dried over phosphorous pentoxide and silica gel. A mixture of the thus-prepared 2-nitro-3,4,5-trimethoxybenzoic acid chloride and 5.4 parts by weight of methyl reserpate in 50 parts by volume of pyridine is allowed to stand at 5° for 10 days. The solvent is evaporated under reduced pressure, the residue dissolved in chloroform, which solution is washed with three 400 parts by volume portions of 2% aqueous hydrogen chloride, 400 parts by volume of water, two 400 parts by volume portions of 2% aqueous potassium hydroxide and 400 parts by volume of water, and then dried over sodium sulfate. The chloroform is evaporated, the residue triturated with ether, filtered off and then dissolved in benzene. The benzene solution is three times filtered through Florex, evaporated and the residue triturated with ether. The light brown methyl O-(2-nitro-3,4,5-trimethoxy-benzoyl)-reserpate is filtered off, M.P. 145–155°.

Example 11

3 parts by weight of methyl O-(3-methoxy-4-ethoxycarbonyloxy-5-nitro-benzoyl)-reserpate is dissolved in 250 parts by volume of ethanol containing 0.5 part by weight of 10% palladium on charcoal and hydrogenated at room temperature. After filtration the solvent is partially evaporated under reduced pressure until crystallization occurs. Ether is added and the light brown methyl O-(3-methoxy-4-ethoxycarbonyloxy-5-amino-benzoyl)-reserpate is filtered off, M.P. 185–205°.

The starting material used in the above reaction may be prepared as follows: A mixture of 22 parts by volume of 3-methoxy-4-ethoxycarbonyloxy-5-nitro-benzoyl chloride and 10 parts by weight of methyl reserpate in 100 parts by volume of pyridine is allowed to stand at 5° for 5 days; and solvent is then evaporated under reduced pressure. The residue is dissolved in chloroform, the insoluble material filtered off, the solution washed three times with 2% aqueous hydrogen chloride, water, twice with 2% aqueous potassium hydroxide and again with water and then dried over sodium sulfate. After evaporation of the solvent, the methyl O-(3-methoxy-4-ethoxycarbonyloxy-5-nitro-benzoyl)-reserpate is obtained in needles, M.P. 188–200°.

Example 12

A solution of 2.5 parts by weight of methyl O-(2-methoxy-5-nitro-benzoyl)-reserpate and 2 parts by volume of 38% aqueous formaldehyde in 500 parts by volume of ethanol is hydrogenated in the presence of 2.5 parts by weight of 10% palladium on charcoal. The reaction mixture is filtered, the filtrate concentrated, and the residue recrystallized from methanol, yielding the methyl O-(2-methoxy-5-dimethylamino-benzoyl)-reserpate, M.P. 145–150°.

The starting material used in the above reaction may be prepared by reacting the 2-methoxy-5-nitro-benzoic acid chloride with methyl reserpate as previously described; the methyl O-(2-methoxy-5-nitro-benzoyl)-reserpate melts at 236° (with decomposition).

Example 13

A solution of 1.74 parts by weight of methyl O-(2-hydroxy-5-nitro-benzoyl)-reserpate in 30 parts by volume of ethanol is hydrogenated in the presence of 0.35 part by weight of 10% palladium on charcoal. After completion 100 parts by volume of ethanol is added, the mixture warmed to complete solution of the organic material and the catalyst then filtered off. On cooling, the methyl O-(2-hydroxy-5-amino-benzoyl)-reserpate crystallizes and is recrystallized from ethanol, M.P. 230–233° (with decomposition).

The starting material used in the above reaction may be prepared by treating methyl reserpate with 2-ethoxy-carbonyloxy-5-nitro-benzoic acid chloride as previously described; the ethoxyformyloxy group is hydrolized in the course of the reaction to the hydroxyl group. The methyl O-(2-hydroxyl-5-nitro-benzoyl)-reserpate melts at 235° (with decomposition).

*Example 14*

A mixture of 1.4 parts by weight of methyl O-(3.5-dinitro-benzoyl)-reserpate, 2 parts by volume of 37% aqueous formaldehyde and 2 parts by weight of 10% palladium on charcoal in 200 parts by volume of methanol is hydrogenated for 18 hours. The reaction mixture is filtered, the filtrate evaporated under reduced pressure, and the residue recrystallized from a mixture of ethanol and water under a nitrogen atmosphere. The methyl O-(3,5-bis-dimethylamino-benzoyl)-reserpate melts at 260–261°.

*Example 15*

To a mixture of 27.5 parts by weight of methyl reserpate in 275 parts by volume of dry pyridine is added 17.7 parts by weight (20 percent excess) of 3-dimethyl-amino-benzoyl chloride hydrochloride while stirring and in an atmosphere of nitrogen. The reaction mixture is allowed to stand at 20–25° for 18 hours and then slowly poured into 2750 parts by volume of ice-water while stirring. The yellow precipitate is collected, washed with water and then dissolved in 126 parts by volume of methylene chloride. The water layer is discarded; the methylene chloride solution is passed through a column of 25 parts by weight of a magnesium aluminum silicate absorbent (Florisil) and the column washed with about 190 parts by volume of methylene chloride. The combined methylene chloride solutions are evaporated to dryness and 100 parts by volume of methanol is added. The solution is seeded with crystalline methyl O-(3-dimethylamino-benzoyl)-reserpate obtained according to the procedure to yield 21.2 parts by weight of the pure compound.

What is claimed is:

1. A member selected from the group consisting of methyl O-benzoyl-reserpate, in which benzoyl represents the radical of the formula:

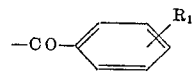

in which $R_1$ represents a di-lower alkyl-amino, and therapeutically acceptable acid addition salts thereof.

2. Methyl O-(4-amino-benzoyl)-reserpate.
3. Methyl O-(3-amino-benzoyl)-reserpate.
4. Methyl O-(4-dimethylamino-benzoyl)-reserpate.
5. Methyl O-(4-dimethylamino-benzoyl)-reserpate.
6. Methyl O-(3,5-bis-dimethylamino - benzoyl) - reserpate.
7. Methyl O-(2-methoxy-5 - dimethylamino - benzoyl)-reserpate.

References Cited in the file of this patent

UNITED STATES PATENTS

| | | |
|---|---|---|
| 2,824,874 | Schlittler | Feb. 25, 1958 |
| 2,867,622 | Lucas | Jan. 6, 1959 |

OTHER REFERENCES

Schlittler: Annals of N.Y. Academy Sci., vol. 59, Art. 1, pages 1–7 (1954).

UNITED STATES PATENT OFFICE
CERTIFICATE OF CORRECTION

Patent No. 3,025,298                         March 13, 1962

Emil Schlittler

It is hereby certified that error appears in the above numbered patent requiring correction and that the said Letters Patent should read as corrected below.

Column 1, line 53, for "3,400" read -- 3,440 --; column 12, line 19, for "O-(4-" read -- O-(3- --.

Signed and sealed this 16th day of October 1962.

(SEAL)
Attest:

ERNEST W. SWIDER
Attesting Officer

DAVID L. LADD
Commissioner of Patents